United States Patent
Papasakellariou

[19]

[11] Patent Number: 5,974,080
[45] Date of Patent: Oct. 26, 1999

[54] HIERARCHICAL-SERIAL ACQUISITION METHOD FOR CDMA SYSTEMS USING PILOT PN CODES

[75] Inventor: Aristides Papasakellariou, Richardson, Tex.

[73] Assignee: Texas Instruments Incorporated, Dallas, Tex.

[21] Appl. No.: 09/093,649

[22] Filed: Jun. 9, 1998

[51] Int. Cl.$^6$ .................................................. H04B 1/69
[52] U.S. Cl. ........................................ 375/200; 375/208
[58] Field of Search ................................. 375/200, 208, 375/367, 279, 329; 370/515, 206

[56] References Cited

U.S. PATENT DOCUMENTS

| | | | |
|---|---|---|---|
| 4,630,283 | 12/1986 | Schiff | 375/208 |
| 5,003,552 | 3/1991 | Mower | 375/200 |

*Primary Examiner*—Temesghen Ghebretinsae
*Attorney, Agent, or Firm*—J. Dennis Moore; Wade James Brady, III; Richard L. Donaldson

[57] ABSTRACT

A method for a receiving station acquiring a spread spectrum signal, wherein the spread spectrum signal has its frequency spectrum spread by being modulated with a first pseudonoise (PN) code generated serially and cyclically by a transmitting station at a first rate. The method of acquiring comprises the process of determining that the offset of a second PN code, identical to the first PN code but generated by the receiving station at substantially the same rate as the first rate and having its offset controlled by the receiving station, is synchronized with the offset of the PN code of the received spread spectrum signal. In the method a demodulation of a received spread spectrum signal is performed by the receiving station to obtain a demodulated signal. Then, the demodulated signal is tested in a first, test stage by performing one or more basic tests involving comparing the demodulated signal with the second PN code at a predetermined offset. For demodulated signals for which the test stage result is positive the demodulated signal is tested in a second, verification stage by maintaining the second PN code at the predetermined offset, and testing the demodulated signal in a sequence of hierarchically related substages, each having a substage specific criterion. When the demodulated signal fails the test stage or the verification stage, the predetermined offset for the second PN code is changed according to a predetermined sequence, and the step of testing the demodulated signal in the test stage is performed again iteratively until the highest hierarchical level substage specific criterion is achieved, upon the occurrence of which the received spread spectrum signal is acquired.

29 Claims, 4 Drawing Sheets

HIERARCHICAL-SERIAL ACQUISITION METHOD FOR CDMA SYSTEMS USING PILOT PN CODES

TECHNICAL FIELD OF THE INVENTION

The present invention relates to spread spectrum wireless communications systems where a specific spread spectrum pseudonoise (PN) signal is transmitted by one station and used by another station to achieve synchronization. More specifically, the present invention relates to a novel method for providing fast acquisition for such signals while practically avoiding costly false alarms.

BACKGROUND OF THE INVENTION

Spread spectrum communications have been extensively used in such applications as cellular communications and satellite communications. For cellular communications systems, the established form of spread spectrum communications is the code division multiple access (CDMA) scheme. Such communications typically use a pseudonoise (PN) code that is generated serially and cyclically. The PN code is used to modulate a carrier signal in order to spread the spectrum of the carrier signal a desired amount.

With CDMA, the signals from all users simultaneously occupy the same frequency band. The receiver discriminates the multiple signals by exploiting the properties of a PN code that is applied to the signal of each user. The receiver attempts to match in time with the PN code of the desired signal a replica of that PN code. Only then the demodulation result is meaningful; otherwise it appears noise-like. Thus, if the arriving signals have different PN codes or different PN code offsets, they can be discriminated at the receiver. Additional coding can be provided to each signal in order to ensure proper communication in case several signals arrive with the same PN code and PN code offset (e.g., orthogonal coding, use of additional PN codes, etc.).

One of the first actions that a user station must do when such a communication with another station is initiated, is to acquire the signal transmitted by the latter. The usual approach in that case is for the user station to acquire a pilot PN code signal, i.e., a signal modulated by only the PN code and carrying no data, transmitted by the other station. In order to achieve that goal, the user station employs a PN code replica of the pilot signal and tries to synchronize to the pilot signal through correlation with the incoming PN code. However, acquisition may also be based on a data modulated signal.

A PN code is a binary pseudorandom code and each of its elements is called a chip. Because of the pseudonoise code properties, the code autocorrelation results a peak only when the offset between the incoming and local PN codes is less that a chip. Acquisition techniques use that property to align the incoming and local PN codes to within less than a chip. The techniques involve the iterative utilization of the local PN code at a particular offset with respect to a specific time reference, and determination of some property related to degree of correlation. Each particular offset so utilized is termed a hypothesis.

The communication channel and the requirement for short correlation periods introduce several imperfections to the acquisition process that have as an end result the possibility of a miss of the correct chip interval even though the correct hypothesis is employed, i.e. a miss, or an acquisition indication at an incorrect hypothesis, i.e. a false alarm. One of the sources for those events is the noise in the received signal that is added by the channel. The channel noise may be the result of other interfering spread spectrum signals and/or it may be caused by the physical properties of the medium. It can cause the received signal at the correct chip interval to decrease in power, thereby leading to a miss even though the correct hypothesis is used, a miss, or it may cause a power surge at an incorrect hypothesis, thereby leading to incorrect acquisition, a false alarm. A false alarm, and to a lesser extent a miss, can add a considerable amount of time to the acquisition process.

Another source for misses and false alarms, with similar final effects as the channel noise, is the multipath signal fading that may be introduced by the channel.

Finally, due to the usual requirement for short correlation periods, usually much shorter than the PN code period, the PN properties of the pilot code are not fully exploited. The correlation period needs to be short in order to ease the implementation of the correlation process, and/or decrease the correlation time needed to test each hypothesis, and/or minimize the dB losses due to a frequency clock error. As a result, the correlation may exhibit larger peaks at incorrect hypotheses which can lead to false alarms.

The typical approach to mitigate false alarms, while ensuring an acceptably small miss probability and an acceptably small acquisition time, is to split the acquisition process into two stages. The first stage, called test stage (TS, or TS stage), is fast in order to quickly reject most of the incorrect hypotheses.

Notice that all hypotheses are incorrect except those corresponding to samples taken at the correct chip interval. Moreover, the requirements of a fast TS stage and short correlation periods together with the channel effects, can frequently increase the miss probability for the correct hypothesis. This becomes especially important for communications in environments where the signal may undergo substantial multipath fading and have its power divided among several fading paths.

To partly compensate for that outcome, the TS stage is declared successful for a particular hypothesis when the result of the corresponding correlation exceeds a threshold that is chosen to be considerably smaller than the value of the decision statistic corresponding to the exact time and to the case that all power is contained in one signal path. The threshold value is typically normalized by an estimate of the background noise, in order to mitigate variations in the signal energy caused by fading, and the normalized value is typically larger than one. Nonetheless, as a result of this use of a relatively small threshold value, many incorrect hypotheses may successfully pass the TS stage. However, most incorrect hypotheses are successfully rejected in this stage, and are rejected quickly.

The typical acquisition method then employs a second, longer stage, called verification stage (VS, or VS stage), in order to reject the incorrect hypotheses that got past the TS stage, while making certain that a correct one will be accepted with high probability. The duration of the VS stage is longer than that of the TS stage in order to more rigorously test each hypothesis and average out occasional channel imperfections. If the TS stage is not frequently passed by incorrect hypotheses, the additional time spent in the VS stage will not considerably penalize the acquisition time.

Existing VS methods comprise a single stage and can use different approaches to decide on a particular hypothesis. One such approach is to use diversity and combine the decision statistics from several individual correlations before a final lock decision is made. It is necessary to noncoherently combine decision statistics instead of having a single long correlation period in order to avoid significant dB losses that can be caused by a clock frequency error, and/or due to the limited phase stability and/or due to data modulation of the signal used for acquisition.

This approach has two important disadvantages. First, since the TS threshold has to be such that the miss probability is small even for the worst case scenario, the VS stage may be entered a large number of times during each search. Thus, if the VS stage relies on the decision statistics from many individual correlation periods, say it requires a few milliseconds, then the increase in the acquisition time can be prohibitively large. On the other hand, a shorter VS stage will easily result in several false alarms since signal fades can last up to several milliseconds for low user station speeds and carrier frequencies in the order of 1 GHz. Moreover, occasional high increases in the interfering signals levels or in the noise proportionally increase the false alarm probability while occasional deep fades of the desired pilot considerably decrease the correct detection probability. Thus, the combination of an excessive acquisition time with a large false alarm probability can make this VS method inefficient.

Another VS approach uses majority testing where several individual tests are performed on the same hypothesis and a decision is made based on the number of positive ones. Each test usually comprises several correlation periods and a subsequent comparison of a decision parameter with a threshold. Comparing to the first one, this approach has the advantage that occasional signal fades or interference/noise surges do not affect all correlation periods and may therefore be possibly isolated once a final majority decision is taken. However, many false alarms can again occur and it is not hard to see that this approach suffers from the same basic drawbacks as the first one.

SUMMARY OF THE INVENTION

In accordance with the present invention there is provided a method for acquiring a spread spectrum signal, wherein the spread spectrum signal has its frequency spectrum spread by being modulated with a first pseudonoise (PN) code generated serially and cyclically by a transmitting station at a first rate, the spread spectrum signal being transmitted by the transmitting station and received by a receiving station The method of acquiring comprises the process of determining that the offset of a second PN code, identical to the first PN code but generated by the receiving station at substantially the same rate as the first rate and having its offset controlled by the receiving station, is synchronized with the offset of the PN code of the received spread spectrum signal, at which determination the received spread spectrum signal is acquired. In the method a demodulation of a received spread spectrum signal is performed by the receiving station to obtain a demodulated signal. The inventive method involves the following steps.

Firstly, the demodulated signal is tested in a first, test stage by performing a basic test. The basic test involves the steps of, first, comparing the demodulated signal with the second PN code at a predetermined offset, second, obtaining a decision parameter related to a degree of correlation of the demodulated signal with the second PN code at the predetermined offset, and third, determining whether the decision parameter exceeds a first predetermined threshold value.

Secondly, for demodulated signals for which the test stage result is positive the demodulated signal is tested in a second, verification stage by, first, maintaining the second PN code at the predetermined offset, and second, testing the demodulated signal in a sequence of hierarchically related substages, from a highest hierarchical level substage to a lowest hierarchical level substage, each hierarchical level substage comprising lower hierarchical level substages, the lowest hierarchical level substage involving the basic tests with a second predetermined threshold value, the hierarchical level substage being deemed successful if a substage specific criterion is achieved based on the total number and the number of successful lower hierarchical level substages making up the hierarchical level substage, and each the hierarchical level substage completing when the criterion succeeds or fails.

Thirdly, when the demodulated signal fails the test stage or the verification stage, the predetermined offset for the second PN code is changed according to a predetermined sequence, and the step of testing the demodulated signal in the test stage is performed again.

Fourthly, the foregoing steps are repeated iteratively until the highest hierarchical level substage specific criterion is achieved, upon the occurrence of which the received spread spectrum signal is acquired.

A preferred implementation of the present invention involves a method for establishing synchronization at a user station to an unmodulated signal (pilot) transmitted by another station (e.g. a base station in a cellular system). However, implementations may be made where synchronization at a user station is to a data modulated signal.

One of the advantages of the present invention is to minimize the acquisition time by minimizing the time requirements for the verification part of the acquisition process.

It is yet another advantage of the present invention to practically eliminate the possibility of a false acquisition and thus avoid the excessive time penalties associated with such an outcome.

The present invention achieves the above advantages through the novel implementation of a verification stage (VS). A VS according to the present invention typically includes several hierarchical substages as it was previously mentioned. The overall VS may be structured so as to continue from one substage to the next, at the same hierarchical level, only if the criterion declaring the earlier verification substage, or a set of previous verification substages, as successful is satisfied. In such implementations the overall verification stage entails a serial process where the later parts are considered based on a decision for the result from the earlier parts.

In addition to the majority logic typically involved in each verification substage and its elements (basic threshold tests or lower hierarchical level substages), the verification process may include the use of benchmarks which specify the minimum number of successful elements after a certain number of such elements. In such implementations, if a benchmark is not satisfied, the verification process stops, the current hypothesis is discarded, and the acquisition process continues by examining the next hypothesis. The usefulness of benchmarks is the avoidance of continuing with a potentially long verification stage when some minimum quality criteria are not met in the earlier parts of the verification stage.

These and other features of the invention and its various implementations will be apparent to those skilled in the art from the following detailed description of the invention, taken together with the accompanying drawings.

DETAILED DESCRIPTION OF THE PREFERRED EMBODIMENT

Figure 1:
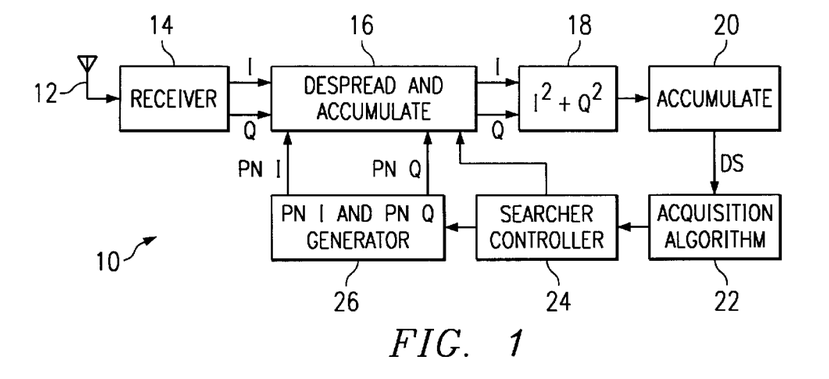
FIG. 1 is a high level block diagram of a PN code acquisition/synch recognition unit in which the preferred embodiment of the present invention may operate.

FIG. 1 is a high level block diagram of a typical PN code acquisition/synch recognition unit 10 in which the preferred embodiment of the present invention may operate. The user station receives a quadrature phase shift keyed ("QPSK") modulated spread spectrum signal at antenna 12. Subsequently, the signal is filtered and downconverted to a lower frequency by receiver 14. The "I" and "Q" components of the signal are demodulated from the signal and then provided to despreading element 16. Typically, the demodulated signal is sampled regularly, and the sample values are digitized. These digitized values are what are provided to despreading element 16. This digitization permits digital processing to accomplish the subsequent steps in the communications process, for example, via a digital signal processor (DSP).

Despreading element 16 multiplies the received signal I and Q components by the I and Q PN codes generated by PN generator 26. The results of these multiplications are then summed over a specific number of chip periods which mainly depend on the frequency error prior to acquisition, and/or the phase stability properties of the signal, and/or the symbol period if the signal used for acquisition is modulated with data. In the exemplary embodiment, both the PN codes generated by PN generator 26 and the incoming PN codes which are the subject of acquisition are assumed to be generated by a pair of maximal length shift registers. Thus, acquisition is equivalent to determining the correct time offset for the shift registers.

Assuming that the received signal is QPSK modulated, the I and Q components at the output of despreading element 16 are squared and summed by a noncoherent envelope detector element 18, to remove the phase dependency from the result and have it depend only on the PN codes' offsets. The result is then optionally passed to noncoherent accumulator 20 which performs a summation for a longer time period than allowed for coherent summation in 16 due to the frequency error between the transmitter and the user station and/or the phase stability properties of the channel and/or data modulation of the signal with which synchronization is to be achieved. The longer summation period helps mitigate the effects of channel fading. However, more computations and additional time may be needed for that purpose and the trade-off may be negative for the resulting acquisition time. The output of the noncoherent accumulator 20, or, if noncoherent accumulator 20 does not exist, the output of noncoherent envelope detector element 18, constitutes the decision statistic ("DS") which is then provided to acquisition unit 22.

Acquisition unit 22 implements the preferred acquisition method. The acquisition method consists of a TS stage and a VS stage. The TS stage involves a simple comparison of the DS against a threshold value. If the threshold is not exceeded, the current hypothesis is discarded and the next one is examined. In that case, acquisition unit 22 instructs searcher controller 24 to delay PN code generator 26 by one hypothesis (offset) interval so that the next hypothesis (offset) is considered for possible acquisition.

If the threshold is exceeded, the acquisition method enters the VS stage and continues examining the current hypothesis. Then, acquisition unit 22, instructs searcher controller 24 to maintain PN code generator 26 so that PN code elements (chips) are generated at the same rate as the rate of the incoming PN code. The searcher controller may also change the summation in element 16 once the acquisition process enters the VS stage.

Only at the end of the VS stage will acquisition unit 22 instruct searcher controller 24 to delay PN code generator 26 by one hypothesis (offset) interval so that the next hypothesis (offset) is examined. This assumes that either the VS fails or more offsets are considered for possible acquisition until the end of the PN code offset uncertainty area. Otherwise, if acquisition is declared immediately after the VS succeeds, acquisition unit 22 may instruct searcher controller 24 to maintain PN code generator 26 and begin performing demodulation for the information signal.

Figure 2:
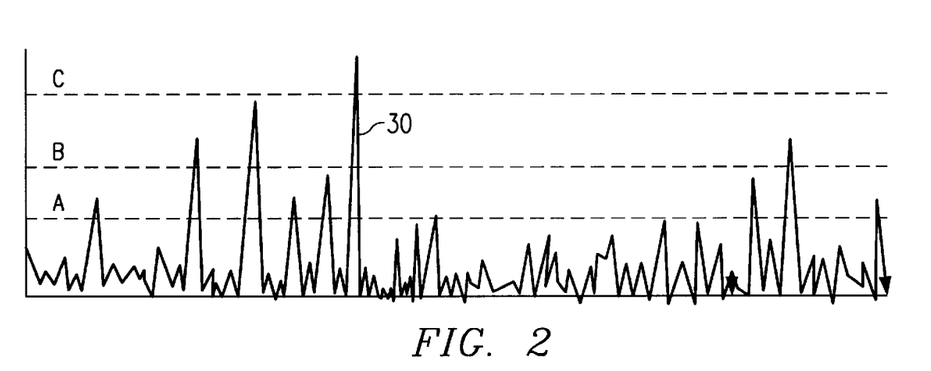
FIG. 2 is a graph of an exemplary profile of decision statistic values obtained for various PN code offsets hypotheses.

FIG. 2 illustrates an exemplary profile 30 of the decision statistic values obtained for various PN code offset hypotheses. The vertical axis represents the decision statistic, while the horizontal axis represents PN code offset hypotheses. The levels A, B, and C represent different threshold values which may be used during the acquisition process (more or less threshold values could also be used). As mentioned above, the PN code offsets at which a particular threshold is exceeded may or may not represent the PN code offset for acquisition. Also, due to multipath propagation, more than one PN code offsets may correspond to valid acquisition of the transmitted signal.

Now, the previous shortcomings of conventional approaches are practically overcome by the novel VS method that is presented herein. The VS is designed so that it uses a very small portion of time relative to the time required to search the entire code uncertainty area, and false alarms are practically non-existent. This is accomplished by having a verification stage with requirements and duration that are long enough to ensure that false alarms are avoided while partitioning the verification stage into substages. These substages are serially executed, and a later substage is performed only if former substages had been successful according to a specified criterion. This ensures that only a short time period is spent on the average for incorrect hypotheses that happen to pass the test stage and enter the verification stage. Each verification substage may itself comprise several substages leading to a hierarchical implementation for the verification stage. The number of serial substages, the number of threshold tests performed in each substage, and the degree of hierarchy can be chosen so that the acquisition time is minimized for a variety of channel scenarios and range of received signal-to-noise ratios.

Figure 3:
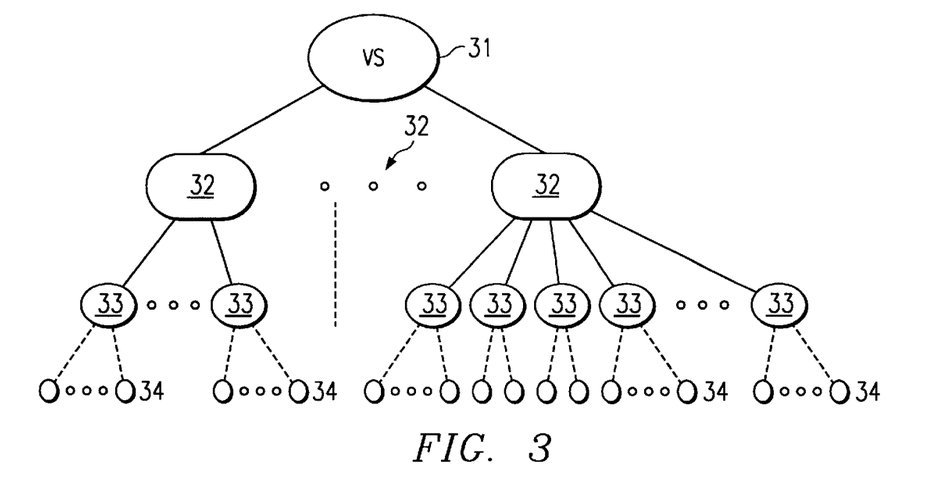
FIG. 3 is a diagram of a model of an exemplary implementation of the verification stage of a preferred embodiment of the present invention.

FIG. 3 presents a model of an exemplary implementation for the verification stage. The corresponding process and an exemplary embodiment will be described later. The verification stage 31 comprises several verification substages 32. The verification substages 32 may, in general, themselves comprise a number of lower level substages. In this embodiment, only two levels of substages, 33 and 34, are shown. The fundamental elements in the hierarchy 34 are the individual comparisons of the decision statistic against a verification substage specific threshold. A later substage may be performed only when a majority testing criterion, i.e., m successes out of n tests, for the previous substages is satisfied (notice that majority testing may involve only a single test in which case a substage is performed only when the immediately previous substage is successful). A substage is deemed successful according to a majority testing decision for the elements (substages) that are immediately below in the hierarchy. Notationally, a test requiring m successes out of n tests is frequently referred to as an (m, n) majority logic test.

It should be noted that the implementation of the test stage and the selection of its parameters selection also have a direct impact on the resulting acquisition time. Although the test stage may be chosen to have a structure similar to the verification stage, in the exemplary embodiment it is assumed that the test stage is simply performed by a threshold comparison of the decision statistic obtained at the hypothesis under consideration.

Since the first fast VS substage occurs only if the TS stage succeeds, for a reasonably well performing TS stage, it does not penalize the acquisition time. Its purpose is to further diminish the possibility that an incorrect hypothesis enters the final, long VS substage. In that sense, it effectively assists the TS stage while avoiding the time penalty of an overall long VS stage. If the criteria at the first VS substage are relatively weak and the TS false alarm probability is small, more weak VS substages may follow.

With the exception of the TS stage which is made of a single, short correlation period, each VS substage can employ diversity combining and majority logic decision. For the correct hypothesis and for the first one or few more fast VS substages, since the TS stage was successful, it is unlikely that the signal is in a fade. Hence, the majority testing of the fast VS substage should not allow for many test failures. Also, the first one or few more VS substages after the TS stage have to be fast for the additional purpose of ensuring that the signal does not go into a fade. It is desirable for the majority logic of the initial, otherwise weak VS substage (low thresholds, a small number of required successes) to be strict allowing only a few failures. This minimizes the time spent in the first VS substage.

The general notation for the verification stage process will now be described. The verification stage consists of K substages which can be referred to as substages of the first hierarchical level. Each of the K substages of the first hierarchical level consist of substages belonging to a second hierarchical level. The number of substages in the second hierarchical level depends on the substage of the first hierarchical level to which the former substages belong. The kth first hierarchical level substage, k=1, ..., K, consists of T(k) second hierarchical level substages. Each of the second hierarchical substages may itself consist of substages of a third hierarchical level. The mth second hierarchical level substage, m=1, ..., $T_k$, of the $k^{th}$ first hierarchical level substage, k=1, ..., K, consists of T(m(k)) third hierarchical level substages. The process continues in the similar fashion until the lowest level in the hierarchy, i.e. the one comprising threshold comparison tests, is reached. Substages belonging to the same hierarchical level and to the same substage of the immediately higher hierarchical level are serially executed. The execution of each substage may stop unless a criterion regarding the successful completion of its lower hierarchical level substages is satisfied.

The exemplary embodiment will now be described. Attention is focused on the VS stage since the TS stage is assumed to be a simple threshold comparison of the decision statistic (nevertheless, the TS stage may have a similar structure to the VS stage). Once the TS threshold is exceeded, the acquisition process enters the VS stage which is assumed to consist of two substages, i.e., K=2. The first VS substage is very fast and not very rigorous. Its purpose is to further verify the current hypothesis while making it easy for the correct hypothesis to succeed (for example, by requiring a small number of successful tests and/or by having low thresholds). The hierarchy of the first VS substage consists of two substages, i.e., T=2. A success for the first VS substage requires that 1 of its 2 immediately lower level substages is successful ((1, 2) majority logic). These immediately lower level substages have the same structure as the VS substage, i.e., they consist of two threshold tests, i.e., T(1(1))=T(2(1))=2, and a success declaration is made if one of the tests is successful by exceeding the corresponding threshold ((1, 2) majority logic). No diversity combining is used.

The process is completed with a second, final VS substage. The purpose of the final VS substage is twofold. It ensures that the correct hypothesis is not dismissed while ensuring that false alarms do not occur. In order to achieve both of those goals, the final VS substage may have as an objective to override most fades if that is allowed by the time clock accuracy and drift.

When testing a particular hypothesis for many correlation periods, the time error can decrease or increase depending on the time clock error. For the worst case that the time error increases, the additional time shift caused by the time clock error should be small in order to avoid substantial dB losses. The value for the maximum allowable time drift while examining a particular hypothesis should typically be confined to less than 0.1 $T_C$, where $T_C$ is the chip duration.

Since the final VS substage has to operate under all possible mobile speeds, care must be taken in order to ensure that the required number of individual successful tests is low enough to allow for a large number of unsuccessful ones due to fades (especially at low speeds or low SNRs), and large enough to avoid false alarms. The final VS substage is terminated once the required number of successes is achieved and it does not have to continue with the remaining substages. A success for each substage is again achieved if the substages that are immediately below in the hierarchy satisfy a certain criterion.

Also, each individual VS substage (of a lower hierarchical level) in the final VS substage can now afford to be much stricter than the previous, initial VS substages. This is because there will be periods when the signal does not fade and therefore, a strict VS substage will succeed, while when the signal is in a fade, the substage should terminate quickly.

However, the total number of successful substages (of lower hierarchical levels) has to be small relative to the total number of substages. Clearly, each individual substage in the final VS substage can have its own majority logic, correlation periods, diversity combining periods, and thresholds. The number of successes required to avoid false alarms with an arbitrary probability for any system/channel setup, especially the ones that more likely result to false alarms, can be easily determined through actual tests or simulations.

Since the final VS substage may be very long, it is desirable to limit the time spent in that stage due to a false alarm in the TS stage and the first few fast VS substages. This is accomplished by introducing benchmarks. The benchmarks are usually weak majority testing criteria that are imposed on the substages that comprise the final VS substage. If a benchmark is not achieved, the VS is immediately exited and the acquisition process continues with the next hypotheses. The weak condition of each benchmark is intended to assist the correct hypothesis while the presence of benchmarks has the purpose of stopping the final VS substage from continuing for a much longer time when the hypothesis is most likely incorrect. The benchmarks, in conjunction with the first fast VS substage(s) and the TS stage, practically ensure that if the final VS substage incorrectly continues, this is due to an unusually long and severe fade. The hypothesis associated with the fade will be dismissed towards the end of the final VS substage since the required number of successes, which can be larger than the ones expected to be caused by long, deep fades, will not be reached.

For example, if the final VS substage has three levels of hierarchy, i.e., it comprises second hierarchical level substages, each comprising third hierarchical level substages, which comprise individual threshold tests, the final VS substage can have a benchmark of one successful second hierarchical level substage out of three (a (1,3) majority testing. The (1, 3) logic is weak enough for the correct hypothesis to satisfy. A second benchmark can have a majority logic (2, 6), a third benchmark can have a majority logic (3, 12), etc. Although benchmarks can be placed at any hierarchical level substage in the final VS substage, their usefulness and effectiveness are usually better when they are applied early. The majority logic for the first hierarchical level final substage is (6,20), each second hierarchical level substage has a majority logic of (1,2) and each third hierarchical level substage has majority logic (2,3).

Figure 4:
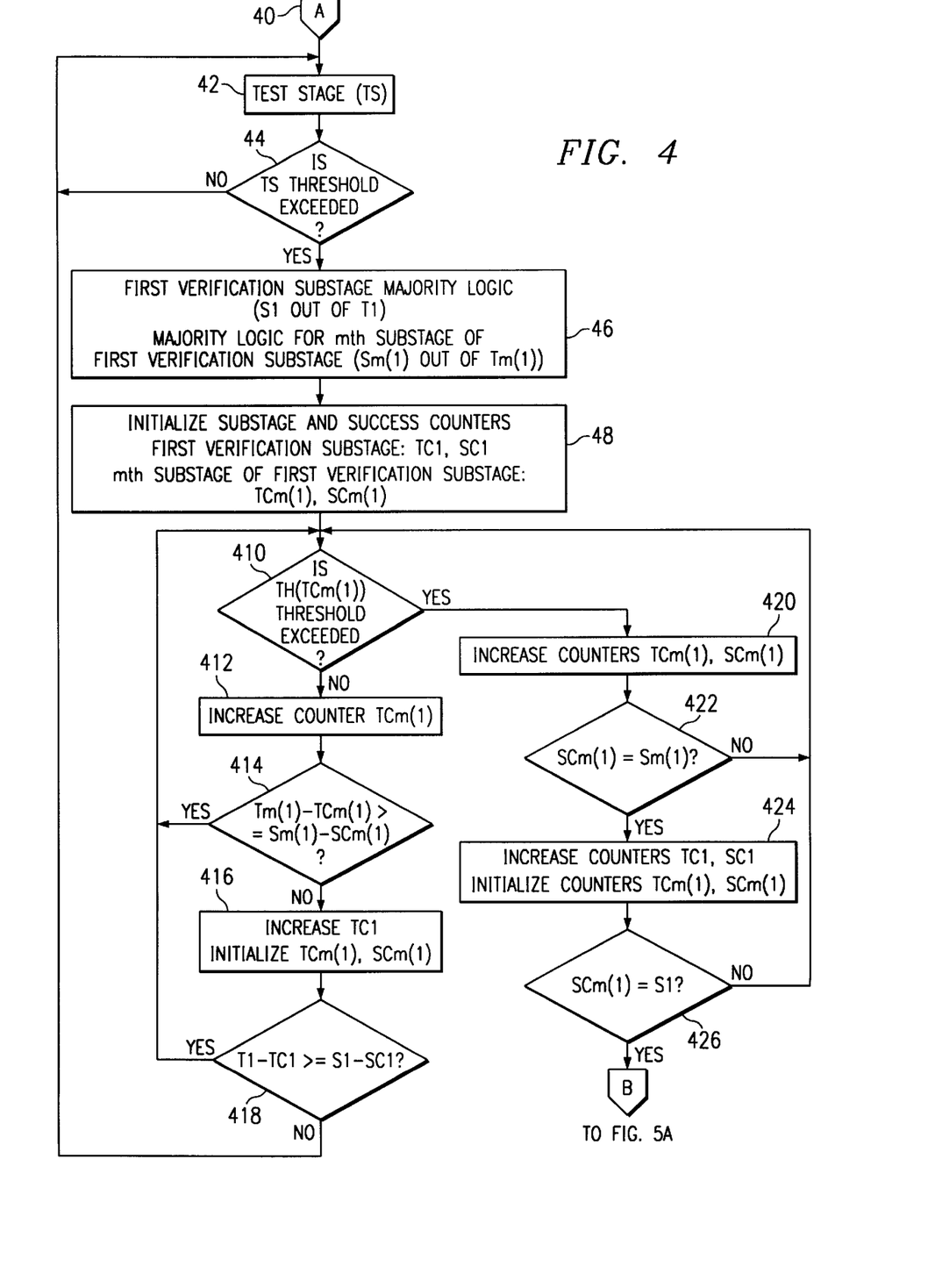
FIG. 4 is, with FIG. 5, a flow chart of a verification stage algorithm according to a preferred embodiment of the present invention.
Figure 5A:
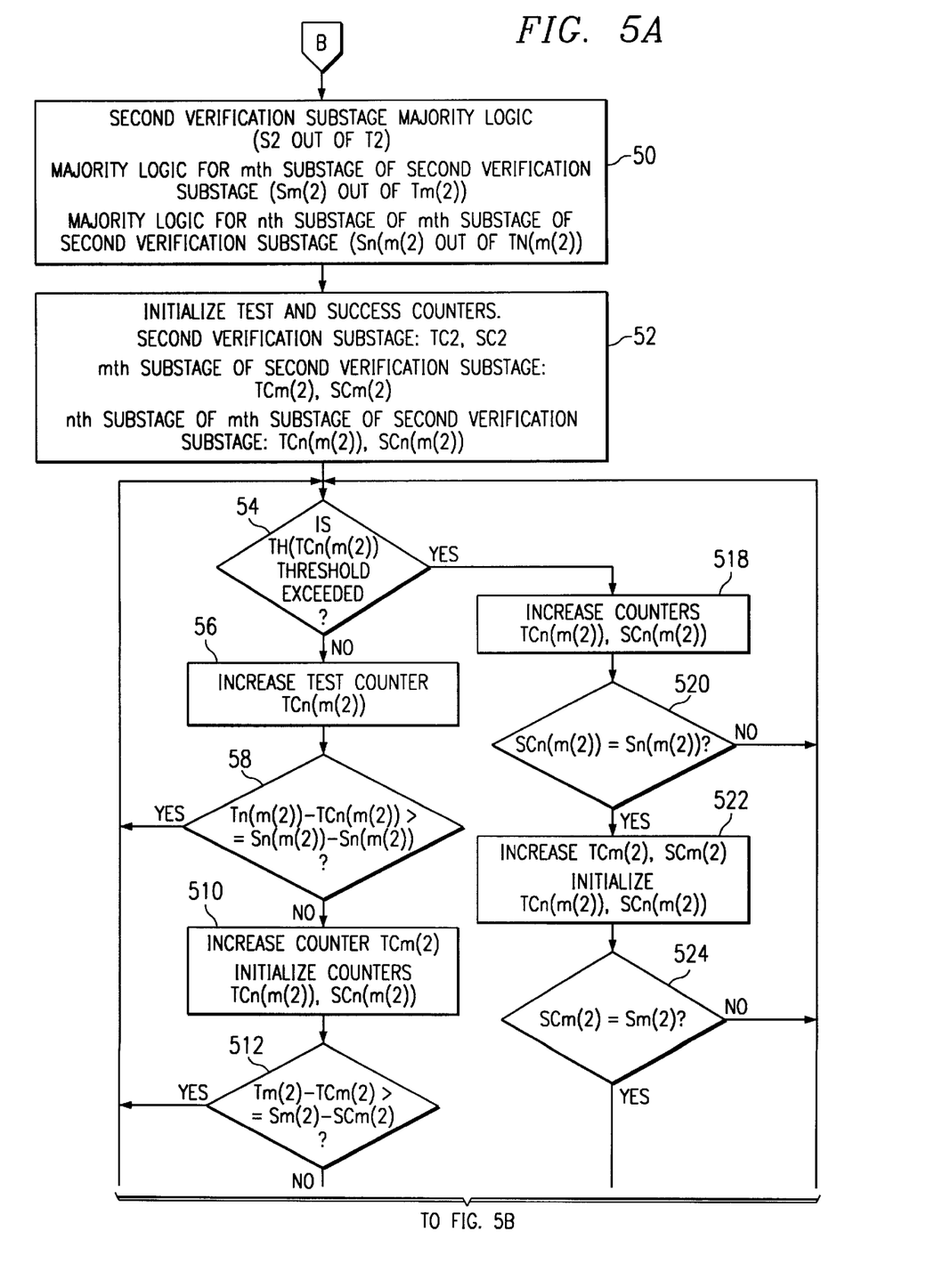
FIG. 5 is, with FIG. 4, a flow chart of a verification stage algorithm according to a preferred embodiment of the present invention.
Figure 5B:
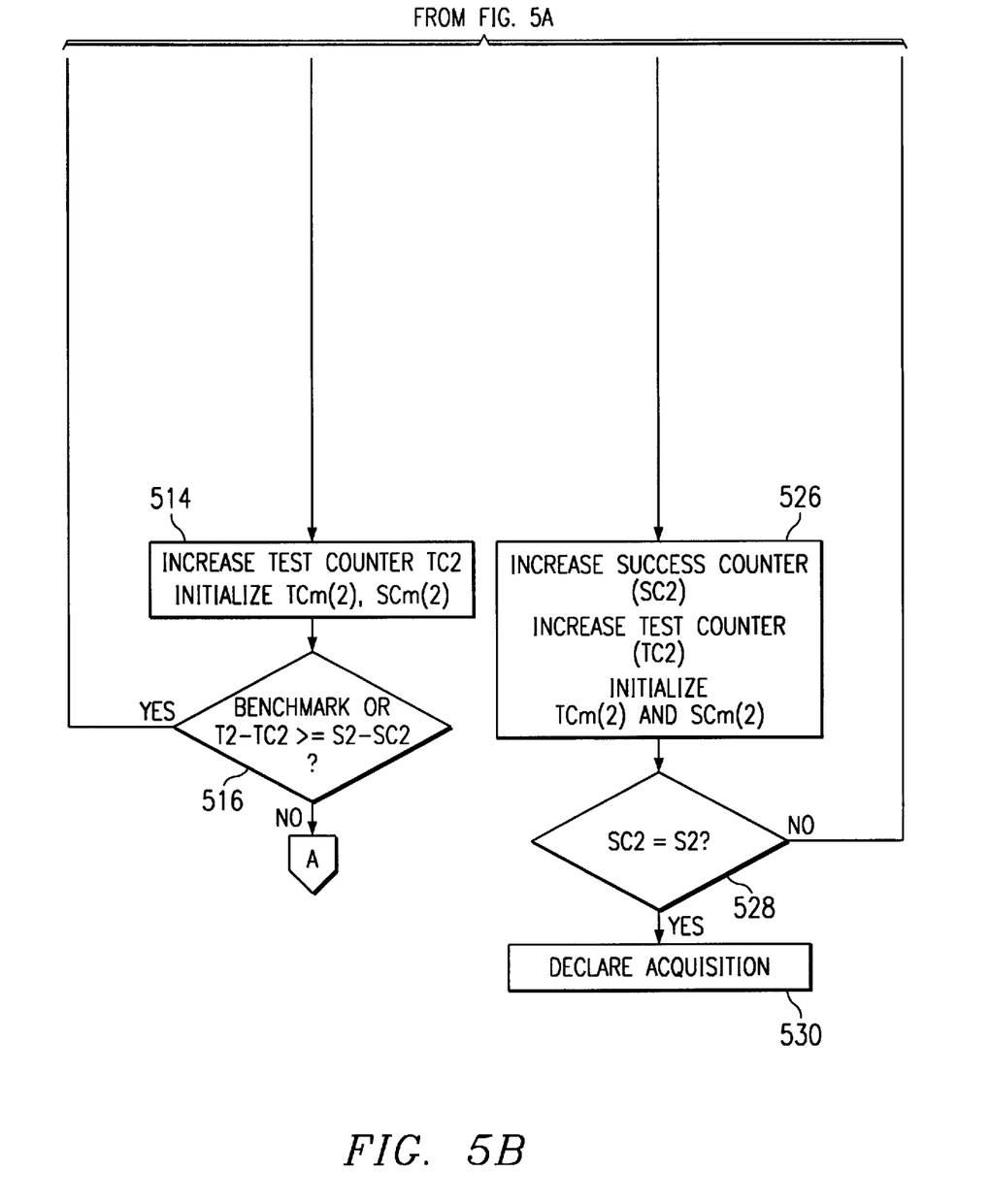

A description of an exemplary embodiment for this VS algorithm is given in FIGS. 4 and 5, wherein two first hierarchical level VS substages are employed (K=2). The second VS substage is entered only when the first VS substage is successful. However, it will be appreciated that modifications to that assumption and to the number of VS substages can readily be made.

Referring first to FIG. 4, the algorithm enters at point A 40. The decision statistic corresponding to a new hypothesis, in this case the first hypothesis, is provided to the TS stage in step 42. A threshold comparison of the decision statistic is performed in step 44 where it is determined whether the TS stage threshold is exceeded. If it is not, the algorithm returns to step 40, a new hypothesis is again selected for test, and the process proceeds as before.

On the other hand, if in step 44 the TS threshold is exceeded, a first verification substage, having a first set of parameters, is entered, in step 46. This first hierarchical level substage is assumed to have only second hierarchical level substages, each comprising of basic threshold comparison tests (more hierarchical levels can be readily used). The first hierarchical level substage involves a total of $T_1$ second hierarchical level substages where $S_1$ of them are required to be successful (e.g., $T_1=2$, $S_1=1$, majority logic of (1,2)). Each of the m, m=1,2, second hierarchical level substages may comprise of a different number of threshold comparison tests $T_{m(1)}$, may have a different success requirement $S_{m(1)}$, and may use different thresholds.

The first verification substage begins in step 48. In step 48, the second hierarchical level substage counter $TC_1$, and the threshold comparison test counter $TC_{m(1)}$, for each of the m=1,2 second hierarchical level substages, are initialized with the value one. Also in step 48, the corresponding success counters $SC_1$ and $SC_{m(1)}$ are initialized with the value zero. Subsequently, in step 410, the new decision statistic is compared against the threshold value for the current second hierarchical level substage.

If the threshold is not exceeded, the counter $TC_{m(1)}$ is increased by one in step 412. The comparison $T_{m(1)}-TC_{m(1)}>=S_{m(1)}-SC_{m(1)}$?

is then made in step 414 to verify if the number of the remaining threshold tests in the current second hierarchical level substage is adequate to meet the majority testing criterion. If that criterion can still be satisfied, the process continues with a new decision statistic and the same substage. If that criterion cannot be satisfied, the counter $TC_1$ is increased by one in step 416 and the counters $TC_{m(1)}$ and $SC_{m(1)}$ are initialized. Subsequently, the first hierarchical level substage criterion is examined at step 418 by making the comparison $T_1-TC_1>=S_1-SC_1$?

If that criterion cannot be satisfied, the process continues with a new hypothesis at step 40. If that criterion can still be satisfied, the process continues at step 410 with a new decision statistic for the same first hierarchical level substage, the next second hierarchical level substage, and the first threshold comparison test.

If at step 410 the decision statistic is larger than the threshold, both counters $TC_{m(1)}$ and $SC_{m(1)}$ are increased by one at step 420. Subsequently, at step 422, the success counter $SC_{m(1)}$ is compared to the required number of successes $S_{m(1)}$ for the particular second hierarchical level substage. If $S_{m(1)}$ has not been reached, the process continues with a threshold comparison test for a new decision statistic. If $S_{m(1)}$ has been reached, the counters $TC_{m(1)}$ and $SC_{m(1)}$ are initialized and both $TC_1$ and $SC_1$ counters are increased at step 424. The substage success counter $SC_1$ is then compared against the required number of successful second hierarchical level substages $S_1$ at step 426. If the required number of successful second hierarchical level substages $S_1$ has been reached, the verification stage continues with the next first hierarchical level substage. Otherwise, it continues with a new decision statistic for the same first hierarchical level substage, the next second hierarchical level substage, and the first threshold test at step 410.

Referring now to FIG. 5, the second first hierarchical level substage, having a second set of parameters, begins at step 50 by establishing its parameters setup. The first hierarchical level substage comprises of second hierarchical level substages. Each of the latter comprises of third hierarchical level substages; each comprising of basic threshold comparison tests. In step 52 the counters for the threshold comparison tests ($TC_{n(m(2))}$), for the third hierarchical level substages ($TC_{m(2)}$), and for the second hierarchical level substages ($TC_2$), are initialized with value one. Step 52 also initializes the success counters for threshold comparison tests ($SC_{n(m(2))}$), for the third hierarchical level substages ($SC_{m(2)}$), and for the second hierarchical level substages ($SC_2$) success counters with the value zero. Subsequently, in step 54 the new decision statistic is compared against the threshold value at the current third hierarchical level substage.

If the threshold is not exceeded, the counter $TC_{n(m(2))}$ is increased in step 56. The comparison $T_{n(m(2))}-TC_{n(m(2))}>=S_{n(m(2))}-SC_{n(m(2))}$?

is then made in step 58 to verify that number of the remaining threshold tests in the current third hierarchical level substage is adequate to meet the majority testing criterion for that substage. If the substage criterion can still be satisfied, the process continues with a new decision statistic and the same substage at step 54. If the substage criterion cannot be satisfied, the counter $TC_{m(2)}$ is increased by one and the counters $TC_{n(m(2))}$ and $SC_{n(m(2))}$ are initialized in step 510. Subsequently, the criterion for the second hierarchical level substage is examined at step 512 by making the comparison $$T_{m(2)} - TC_{m(2)} \geq S_{m(2)} - SC_{m(2)}?$$

If that criterion can be satisfied, the process continues with a new decision statistic and the same second hierarchical level substage at step 54. If that criterion cannot be satisfied, the counter $TC_2$ is increased by one and the counters $TC_{m(2)}$ and $SC_{m(2)}$ are initialized at step 514. Subsequently, the benchmarks are examined at step 516, as well as the conditions to meet the first hierarchical level substage majority testing criterion by making the comparison $$T_2 - TC_2 \geq S_2 - SC_2?$$

If any of those cannot be satisfied, the verification stage is aborted and the acquisition process continues with a new hypothesis at step 40. Otherwise, the first hierarchical level substage continues with a new decision statistic for the same hypothesis at step 54.

If the threshold at step 54 is exceeded, both $TC_{n(m(2))}$ and $SC_{n(m(2))}$ counters are increased at step 518. Subsequently, at step 520, the success counter $SC_{n(m(2))}$ is compared to the required number of successes $S_{n(m(2))}$ for the current third hierarchical level substage. If $S_{n(m(2))}$ has not been reached, the process continues with the next decision statistic for the same hypothesis at step 54. If $S_{n(m(2))}$ has been reached, the counters $TC_{n(m(2))}$ and $SC_{n(m(2))}$ are initialized and the counters $TC_{m(2)}$ and $SC_{m(2)}$ are increased by one at step 522.

The success counter $SC_{m(2)}$ is then compared against the required number of successful third hierarchical level substages $S_{m(2)}$ at step 524. If $S_{m(2)}$ has not been reached, the next decision statistic for the same hypothesis and substage is examined at step 54. If $S_{m(2)}$ has been reached, the counters $TC_{m(2)}$ and $SC_{m(2)}$ are initialized and both counters $TC_2$ and $SC_2$ are increased by one at step 526. The second hierarchical level substage success counter $SC_2$ is then compared against the required number of second hierarchical level successful substages $S_2$ at step 528. If $S_2$ has not been reached, the next decision statistic for the same hypothesis is examined at step 54. If $S_2$ has been reached, acquisition is declared for the examined hypothesis at step 530.

It will be readily appreciated that the main difference between the two substages is the additional substage that exists in the second substage and the use of benchmarks. The previously described algorithm can easily use this nesting process and extend to an arbitrary number of substages within the same substage of higher hierarchical level and to any number of total substages. The structure and parameters choices for the overall acquisition scheme (or for the particular substages) should obviously be based on the features of the particular application.

Another option for the implementation of the VS method is to not only check the current PN code offset but also the offsets advanced/delayed by $T_C/4$ or $T_C/2$. This may be useful if the requirements to override fades result in a considerable code drift that can significantly reduce the effective signal-to-noise ratio but it is nevertheless smaller than one of the above offsets. Then, the correct hypothesis can again be checked with minimum signal-to-noise ratio losses since, for at least one of the two such tests, the time clock drift is partly compensated and the additional code drift can only be beneficial to the effective signal-to-noise ratio. A successful lock can then be declared with a majority logic, e.g. if two out of the possible three tests are successful. In that way, if necessary, the overall VS is made longer to combat occasional fades leading to false alarms.

Another option to further suppress the probability of false alarm occurs in situations when it is desirable to search the entire code period before making a synchronization decision. For example, in cellular networks, different base stations may use different offsets of the same PN code pilot and the one corresponding to the "stronger" indication should be preferably selected. Measures for the strength of the lock indication can be the value of the correlation, the total number of tests necessary for acquisition, and the number of successful tests in a specific number of tests. In that case, false alarms are further suppressed if it is determined that it is more likely for the correct hypothesis to result to a stronger lock indication.

All of the foregoing variations can be considered by the routineer in the art, once the principles of the present invention, as set forth herein, are understood, and a given system optimized according to the specific requirements and constraints for a particular application.

Although the present invention and its advantages have been described in detail, along with numerous variations for implementation, it should be understood that further changes, substitutions and alterations can be made herein without departing from the spirit and scope of the invention as defined by the appended claims.

What is claimed is:

1. A method for acquiring a spread spectrum signal, wherein said spread spectrum signal has its frequency spectrum spread by being modulated with a first pseudonoise (PN) code generated serially and cyclically by a transmitting station at a first rate, said spread spectrum signal being transmitted by said transmitting station and received by a receiving station, wherein said method of acquiring comprises the process of determining that the offset of a second PN code, identical to said first PN code but generated by said receiving station at substantially the same rate as said first rate and having its offset controlled by said receiving station, is synchronized with the offset of the PN code of said received spread spectrum signal, at which determination said received spread spectrum signal is acquired, and wherein a demodulation of a received spread spectrum signal is performed by said receiving station to obtain a demodulated signal, comprising the steps of:

A. testing said demodulated signal in a first, test stage by performing a basic test, said basic test comprising the steps of
      1. comparing said demodulated signal with said second PN code at a predetermined offset,
      2. obtaining a decision parameter related to a degree of correlation of said demodulated signal with said second PN code at said predetermined offset, and
      3. determining whether said decision parameter exceeds a first predetermined threshold value;

B. for demodulated signals for which said test stage result is positive testing said demodulated signal in a second, verification stage by
      1. maintaining said second PN code at said predetermined offset, and
      2. testing said demodulated signal in a sequence of hierarchically related substages, from a highest hierarchical level substage to a lowest hierarchical level substage, each hierarchical level substage comprising lower hierarchical level substages, said lowest hierarchical level substage comprising said basic tests with a second predetermined threshold value, said hierarchical level substage being deemed successful if a substage specific criterion is achieved based on the total number and the number of successful lower hierarchical level substages comprising said hierarchical level substage, and each said hierarchical level substage completing when said criterion succeeds or fails;

C. when said demodulated signal fails said test stage or said verification stage,
   1. changing said predetermined offset for said second PN code according to a predetermined sequence, and
   2. performing again said step of testing said demodulated signal in said test stage; and D. iteratively repeating the foregoing steps until said highest hierarchical level substage specific criterion is achieved, upon the occurrence of which said received spread spectrum signal is acquired.

2. A method for acquiring a spread spectrum signal according to claim 1 wherein said step of testing said demodulated signal in a sequence of hierarchically related substages comprises the steps of:

A. performing a plurality of said basic tests;

B. determining whether, out of a first predetermined number of said basic tests so performed, a second predetermined number of such basic tests succeed and, if so, signaling that the corresponding lowest hierarchical level substage comprising of said basic tests succeeds, otherwise, signaling that it fails;

C. determining whether, out of a first predetermined number of said lowest hierarchical level substages so performed, a second predetermined number of said lowest hierarchical level substages succeed and, if so, signaling that the substage comprising of said lowest level substages succeeds, otherwise, signaling that it fails, D. continuing in the same manner for all hierarchical level substages, and for any said hierarchical level substage comprising of lower hierarchical level substages determining whether, out of a first predetermined number of said lower hierarchical level substages so performed, a second predetermined number of said lower hierarchical level substages succeed and, if so, signaling that the said hierarchical level substage succeeds, otherwise, signaling that it fails; and E. determining whether, out of a first predetermined number of said highest hierarchical level substages so performed, a second predetermined number of such highest hierarchical level substages succeed and, if so, signaling that the verification stage succeeds and acquisition has occurred, otherwise, signaling that it fails.

3. A method according to claim 1 wherein, in said step of testing said demodulated signal in a test stage,
   A. said step of comparing said demodulated signal with said second PN code at a predetermined offset is performed to obtain a correlation value; and
   B. said step of obtaining a decision parameter is performed by obtaining a decision statistic related to said correlation value.

4. A method according to claim 1 wherein, in said step of testing said demodulated signal in a test stage, said basic test is performed more than once, and wherein said basic test includes predetermined decision parameters and predetermined thresholds which may vary from test to test.

5. A method according to claim 1 wherein, in said step of testing said demodulated signal in a verification stage, said basic test includes different decision parameters and different thresholds for different lowest hierarchical level substages.

6. A method according to claim 2 wherein, in said step of testing said demodulated signal in a verification stage, said first predetermined number and said second predetermined number of any said hierarchical level substage may be different from the corresponding numbers for any other said hierarchical level substage.

7. A method according to claim 1 wherein, in said step of testing said demodulated signal in a verification stage, said substages comprising the same higher hierarchical level substage are examined sequentially.

8. A method according to claim 1 wherein, in said step of testing said demodulated signal in a verification stage, said substage of any hierarchical level may fail and terminate before said criterion, based on lower hierarchical level substages comprising said substage, succeeds or fails if other criteria based on a smaller number of said lower hierarchical level substages fail.

9. A method according to claim 1 wherein said spread spectrum signal is a quadrature phase shift key ("QPSK") modulated signal modulated at a first phase position by said first PN code to provide an I component and modulated at a second phase position by a third PN code, generated serially and cyclically by said transmitting station at said first rate, to provide a Q component, and said received signal is QPSK demodulated using said second and forth PN codes.

10. A method according to claim 9 wherein, in said step of testing said demodulated signal in a test stage, said step of obtaining a decision parameter is performed by obtaining a decision statistic that is the square of said correlation value.

11. A method according to claim 1 wherein, in said step of testing said demodulated signal in a test stage, said basic test is performed a first predetermined number of times, and said demodulated signal passes said test stage if a second predetermined number of said basic tests are positive, wherein said second predetermined number may be the same as said first predetermined number.

12. A method according to claim 1 wherein, in said step of testing said demodulated signal in a test stage, said first predetermined threshold value is determined in dependence upon a level of background noise.

13. A method according to claim 1 wherein, in said step of testing said demodulated signal in a verification stage, said second predetermined threshold value is determined in dependence upon a level of background noise.

14. A method according to claim 1 wherein, in said step of testing said demodulated signal in a verification stage, said method for acquiring a spread spectrum signal repeats after the first acquisition indication in order to obtain acquisition of possible additional paths.

15. A method for acquiring a spread spectrum signal, wherein said spread spectrum signal has its frequency spectrum spread by being modulated with a first pseudonoise (PN) code generated serially and cyclically by a transmitting station at a first rate, said spread spectrum signal being transmitted by said transmitting station and received by a receiving station, wherein said method of acquiring comprises the process of determining that the offset of a second PN code, identical to said first PN code but generated by said receiving station at substantially the same rate as said first rate and having its offset controlled by said receiving station, is synchronized with the offset of the PN code of said received spread spectrum signal, at which determination said received spread spectrum signal is acquired, and wherein a demodulation of a received spread spectrum signal is performed by said receiving station to obtain a demodulated signal, comprising the steps of A. testing said demodulated signal in a first, test stage by performing a basic test, said basic test comprising the steps of 1. comparing said demodulated signal with said second PN code at a predetermined offset,
2. obtaining a decision parameter related to a degree of correlation of said demodulated signal with said second PN code at said predetermined offset, and
3. determining whether said decision parameter exceeds a first predetermined threshold value;

B. for demodulated signals for which said test stage result is positive,
1. maintaining said second PN code at said predetermined offset, and
2. testing said demodulated signal in a second, verification stage by testing said demodulated signal in a sequence of hierarchically related substages, each hierarchical level substage comprising of lower hierarchical level substages, the lowest hierarchical level substage comprising of said basic tests with a second predetermined threshold value, said hierarchical level substage is deemed successful if a substage specific criterion is achieved based on the total number and the number of successful lower hierarchical level substages comprising said hierarchical level substage, and each said hierarchical level substage completes when the said criterion succeeds or fails, the steps of
 a. performing a plurality of said basic tests, until said criterion of first said lowest hierarchical level substage comprising said basic tests achieves a first outcome of succeeding or failing, and signaling said first outcome,
 b. sequentially continuing in the same manner with remaining said lowest hierarchical level substages comprising said hierarchical level substage until said criterion of said hierarchical level substage succeeds or fails and signaling that outcome,
 c. sequentially continuing in the same manner with remaining said hierarchical level substages comprising of said lowest hierarchical level substages until said criterion of said hierarchical level substage comprising of said lowest hierarchical level substages succeeds or fails and signaling that outcome,
 d. sequentially continuing in the same manner for each remaining said hierarchical level substage comprising of said lower hierarchical level substages until said criterion of said hierarchical level substage comprising of said lower hierarchical level substages succeeds or fails and signaling that outcome,
 e. sequentially continuing in the same manner for said highest hierarchical level substage until said criterion of said hierarchical level substages comprising said highest hierarchical level substage succeeds or fails, and signaling the outcome
 f. terminating said testing of said demodulated signal in said verification stage when said corresponding criterion regarding said highest hierarchical level substages succeeds or fails, and signaling the outcome;

C. when said demodulated signal fails said test stage or said verification stage,
1. changing said predetermined offset for said second PN code by a predetermined time interval according to a predetermined sequence, and
2. performing again said step of testing said demodulated signal in said test stage; and D. iteratively repeating the foregoing steps until said received spread spectrum signal is acquired.

16. A method according to claim 15 wherein, in said step of testing said demodulated signal in a test stage,
 A. said step of comparing said demodulated signal with said second PN code at a predetermined offset is performed to obtain a correlation value; and
 B. said step of obtaining a decision parameter is performed by obtaining a decision statistic related to said correlation value.

17. A method according to claim 15 wherein, in said step of testing said demodulated signal in a test stage, said basic test may involve different said decision parameters and different said thresholds for said test stage.

18. A method according to claim 15 wherein, in said step of testing said demodulated signal in a verification stage, said basic test may involve different said decision parameters and different said thresholds for different said lowest hierarchical level substages.

19. A method according to claim 15 wherein, in said step of testing said demodulated signal in a verification stage, said first predetermined number and said second predetermined number of any said hierarchical level substage can be different from the corresponding numbers for any other said hierarchical level substage.

20. A method according to claim 15 wherein, in said step of testing said demodulated signal in a verification stage, said substage of any hierarchical level may fail and terminate before said criterion, based on lower hierarchical level substages comprising said substage, succeeds or fails if other criteria based on a smaller number of said lower hierarchical level substages fail.

21. A method according to claim 15 wherein said spread spectrum signal is a quadrature phase shift key ("QPSK") modulated signal modulated at a first phase position by said first PN code to provide an I component and modulated at a second phase position by a third PN code, generated serially and cyclically by said transmitting station at said first rate, to provide a Q component, and received signal is QPSK demodulated using said second and forth PN codes.

22. A method according to claim 21 wherein, in said step of testing said demodulated signal in a test stage, said step of obtaining a decision parameter is performed by obtaining a decision statistic that is the square of said correlation value.

23. A method according to claim 15 wherein, in said step of testing said demodulated signal in a test stage, said basic test is performed a third predetermined number of times, and said demodulated signal passes said test stage if a fourth predetermined number of said basic tests are positive, wherein said fourth predetermined number may be the same as said third predetermined number.

24. A method according to claim 15 wherein, in said step of testing said demodulated signal in a test stage, said first predetermined threshold value is determined in dependence upon a level of background noise.

25. A method according to claim 15 wherein, in said step of testing said demodulated signal in a verification stage, said second predetermined threshold value is determined in dependence upon a level of background noise.

26. A method according to claim 15 wherein, in said step of testing said demodulated signal in a verification stage, the acquisition process continues after the first acquisition indication in order to possibly obtain acquisition of possible additional paths.

27. A method for acquiring a spread spectrum signal, wherein said spread spectrum signal has its frequency spectrum spread by being modulated with a first pseudonoise (PN) code generated serially and cyclically by a transmitting station at a first rate, said spread spectrum signal being transmitted by said transmitting station and received by a receiving station, wherein said method of acquiring comprises the process of determining that the offset of a second PN code, identical to said first PN code but generated by said receiving station at substantially the same rate as said first rate and having its offset controlled by said receiving station, is synchronized with the offset of the PN code of said received spread spectrum signal, at which determination said received spread spectrum signal is acquired, and wherein a demodulation of a received spread spectrum signal is performed by said receiving station to obtain a demodulated signal, comprising the steps of:

A. comparing said demodulated signal with said second PN code at a predetermined offset;

B. obtaining a predetermined number of decision parameters related to a degree of correlation of said demodulated signal with said second PN code at said predetermined offset;

C. obtaining a new decision parameter based on said predetermined number of decision parameters;

D. determining whether said new decision parameter satisfies a predetermined quality criterion and signaling the outcome;

E. when said quality criterion fails
  1. changing said predetermined offset for said second PN code by a predetermined time interval according to a predetermined sequence, and
  2. repeating the foregoing steps for new predetermined offset;

F. when said quality criterion succeeds
  1. declaring acquisition if said predetermined quality criterion is the last one
  2. repeating the foregoing steps for same predetermined offset and the next predetermined quality criterion if said predetermined quality criterion is not the last one; and G. iteratively repeating the foregoing steps until said received spread spectrum signal is acquired.

28. A method according to claim 27 wherein said spread spectrum signal is a quadrature phase shift key ("QPSK") modulated signal modulated at a first phase position by said first PN code to provide an I component and modulated at a second phase position by a third PN code, generated serially and cyclically by said transmitting station at said first rate, to provide a Q component, and received signal is QPSK demodulated using said second and forth PN codes.

29. A method according to claim 28 wherein, said step of comparing said demodulated signal with sad second PN code at a predetermined offset is performed to obtain a correlation value; and said step of obtaining a predetermined number of decision parameters is performed by obtaining a decision statistic that is the square of said correlation value.

* * * * *